United States Patent
Hegde et al.

(10) Patent No.: US 11,169,973 B2
(45) Date of Patent: Nov. 9, 2021

(54) ATOMICALLY TRACKING TRANSACTIONS FOR AUDITABILITY AND SECURITY

(71) Applicant: International Business Machines Corporation, Armonk, NY (US)

(72) Inventors: Harsha Hegde, Buffalo Grove, IL (US); Michael E. Factor, Haifa (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 131 days.

(21) Appl. No.: 16/548,907

(22) Filed: Aug. 23, 2019

(65) Prior Publication Data
US 2021/0056082 A1    Feb. 25, 2021

(51) Int. Cl.
| | |
|---|---|
| G06F 7/00 | (2006.01) |
| G06F 16/18 | (2019.01) |
| H04L 9/06 | (2006.01) |
| G06F 16/182 | (2019.01) |
| G06F 16/11 | (2019.01) |

(52) U.S. Cl.
CPC ........ *G06F 16/1865* (2019.01); *G06F 16/113* (2019.01); *G06F 16/1837* (2019.01); *H04L 9/0637* (2013.01)

(58) Field of Classification Search
CPC .............. G06F 16/1865; G06F 9/0637; G06F 16/1837; G06F 16/113; G06F 16/13; G06F 16/183; G06F 16/972; H04L 9/085; H04L 9/0894
See application file for complete search history.

(56) References Cited

U.S. PATENT DOCUMENTS

| | | | | |
|---|---|---|---|---|
| 5,032,979 A | * | 7/1991 | Hecht | G06F 21/552 726/25 |
| 6,085,191 A | * | 7/2000 | Fisher | G06F 1/00 707/737 |
| 7,725,558 B2 | * | 5/2010 | Dickenson | G06F 21/78 709/215 |
| 7,783,666 B1 | * | 8/2010 | Zhuge | G06F 16/122 707/783 |
| 8,001,550 B2 | | 8/2011 | Hepworth et al. | |

(Continued)

OTHER PUBLICATIONS

Helland; Immutability Changes Everything; 7th Biennial Conference on Innovative Data System Research (CIDR 15) Jan. 4-7, 2015; pp. 1-6.

(Continued)

*Primary Examiner* — Mohammed R Uddin
(74) *Attorney, Agent, or Firm* — Anthony England; Andrew D. Wright; Roberts Calderon Safran & Cole, P.C.

(57) ABSTRACT

A storage system access point receives a first access request from a client device, wherein the first access request specifies first data. The storage system access point attempts to execute the first access request. In response to successfully accessing the first data, a first message is transmitted to an external audit system indicating that information corresponding to the first access request is to be recorded by the external audit system. In response to that the first data has been successfully accessed, and that the information corresponding to the first access request has been successfully recorded by the external audit system, notifying the client device that the first access request has been successfully completed.

20 Claims, 11 Drawing Sheets

(56) References Cited

U.S. PATENT DOCUMENTS

| | | | |
|---|---|---|---|
| 8,127,134 B2 | 2/2012 | Iyengar et al. | |
| 8,316,237 B1* | 11/2012 | Felsher | H04L 9/0825 |
| | | | 713/171 |
| 8,484,718 B2* | 7/2013 | Chacko | H04L 63/0272 |
| | | | 726/15 |
| 9,712,576 B1* | 7/2017 | Gill | G06F 3/04817 |
| 10,121,114 B2 | 11/2018 | Philip et al. | |
| 10,146,600 B2 | 12/2018 | Kurilov et al. | |
| 10,404,471 B1* | 9/2019 | Griffin | H04L 9/0637 |
| 10,484,343 B1* | 11/2019 | Silberman | H04L 63/0428 |
| 10,796,379 B2* | 10/2020 | Li | G06Q 20/4016 |
| 10,884,810 B1* | 1/2021 | Verma | G06F 9/5061 |
| 2004/0015723 A1* | 1/2004 | Pham | H04L 63/10 |
| | | | 726/27 |
| 2005/0071650 A1* | 3/2005 | Jo | H04L 63/1425 |
| | | | 713/188 |
| 2006/0026672 A1* | 2/2006 | Braun | G05B 19/042 |
| | | | 726/9 |
| 2007/0136603 A1* | 6/2007 | Kuecuekyan | H04L 63/0884 |
| | | | 713/185 |
| 2007/0162520 A1* | 7/2007 | Petersen | G06F 11/141 |
| 2010/0154043 A1* | 6/2010 | Castellucci | G06F 21/6218 |
| | | | 726/7 |
| 2010/0228989 A1* | 9/2010 | Neystadt | G06F 21/6209 |
| | | | 713/185 |
| 2013/0046973 A1* | 2/2013 | Resch | H04L 9/0877 |
| | | | 713/156 |
| 2014/0082749 A1* | 3/2014 | Holland | G06F 21/645 |
| | | | 726/29 |
| 2014/0156961 A1* | 6/2014 | Hadley | G06F 21/74 |
| | | | 711/163 |
| 2014/0181999 A1 | 6/2014 | Khosrowpour et al. | |
| 2015/0186437 A1 | 7/2015 | Molaro | |
| 2016/0011988 A1 | 1/2016 | Shapiro | |
| 2016/0205190 A1 | 7/2016 | Bestler et al. | |
| 2016/0344737 A1 | 11/2016 | Anton et al. | |
| 2016/0350385 A1* | 12/2016 | Poder | G06F 16/185 |
| 2017/0160933 A1 | 6/2017 | De Jong et al. | |
| 2017/0192684 A1 | 7/2017 | Grube et al. | |
| 2017/0293669 A1* | 10/2017 | Madhavan | G06F 16/2365 |
| 2017/0330285 A1* | 11/2017 | Ehrhart | G06Q 40/04 |
| 2017/0364699 A1 | 12/2017 | Goldfarb et al. | |
| 2018/0060596 A1* | 3/2018 | Hamel | H04L 9/3247 |
| 2018/0077173 A1* | 3/2018 | Motwani | H04L 63/1416 |
| 2018/0227119 A1* | 8/2018 | Bibera | H04L 63/083 |
| 2018/0316676 A1* | 11/2018 | Gilpin | H04L 9/0891 |
| 2019/0156429 A1* | 5/2019 | Beckmann | G06Q 20/3827 |
| 2019/0172282 A1* | 6/2019 | Patel | G07C 9/27 |
| 2019/0229890 A1* | 7/2019 | Brehmer | H04L 9/3242 |
| 2019/0268165 A1* | 8/2019 | Monica | H04L 9/3236 |
| 2019/0372779 A1* | 12/2019 | Monica | H04L 9/088 |
| 2020/0058381 A1* | 2/2020 | Patel | G16H 10/60 |
| 2020/0226268 A1* | 7/2020 | Zlotnick | G06F 21/602 |
| 2020/0228530 A1* | 7/2020 | Zlotnick | H04L 63/10 |
| 2020/0380153 A1* | 12/2020 | Mi | H04L 63/126 |

OTHER PUBLICATIONS

Milanova et al.; Inference and Checking Object Immutability; PPPJ 16 Proceedings of the 13th International Conference on Principles and Practices of Programming on the Java Platform: Virtual Machines, Languages, and Tools; Aug. 29-Sep. 2, 2016; pp. 1-12.

Rupprecht et al.; SwiftAnalytics: Optimizing Object Storage for big Data Analytics; IEEE International Conference on Cloud Engineering (IC2E); Apr. 4-7, 2017; pp. 245-251.

Shafagh et al.; Towards Blockchain-Based Auditable Storage and Sharing of IoT Data; CCSW 17 Proceedings of the 2017 on Cloud Computing Security Workshop; Nov. 3, 2017; pp. 45-50.

* cited by examiner

Data Storage System 100

ATOMICALLY TRACKING TRANSACTIONS FOR AUDITABILITY AND SECURITY

BACKGROUND

This invention relates generally to maintaining records of user transactions occurring in an information technology (IT) system, and more particularly to atomically tracking transactions for auditability and security.

Computing devices are known to communicate data, process data, and/or store data. Such computing devices range from wireless smart phones, laptops, tablets, personal computers (PC), workstations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

In various situations, it can be important to maintain traceability and accountability for resources, e.g. files and programs, stored in diverse locations. In most cases, tracking access to resources is done by maintaining access logs at the system storing the resources to be tracked. To achieve the desired traceability and accountability the log files can be audited by select individuals have controlled access to the log files. But this procedure implies trust of system admins and the security process in place across all the systems. Some problems with relying on log-file audits are the possibility of missing entries due to log rotations, the possibility that someone will either intentionally or unintentionally modify the log file, and difficulties anonymizing the data in a log before sharing the log for tracing and auditing purposes. Additionally, if the resource moves, for example between on-premise storage and cloud storage, or if the resource is renamed, multiple different logs are maintained on multiple different machines, making it difficult to properly control access to the logs.

Some have attempted to use conventional blockchain technology to record access information, but current blockchain based tracking involves the client device recording what the client is doing on the client side—it does not record what happens at the server side. Additionally, whether conventional logs or blockchain technologies are used, transactions are recorded after the transaction has been made, meaning that it is possible for a transaction to occur but not be recorded. In view of the above, it is apparent that currently available techniques are less than perfect.

SUMMARY

According to an embodiment of the present invention, a new technique that uses blockchain to track access to computing, storage, or other resources in a way that supports auditing, while ensuring atomicity for successful transactions. For example, during an object write to an object storage system access can be tracked as a unitary transaction that is recorded atomically in a Blockchain for a successful write request. Similarly, during an object read from an object storage access can be tracked as a unitary transaction that is recorded atomically in a block chain for a successful read request.

As used herein the term "atomic," "atomically," "atomicity," and similar terms are used in the sense of referring to the smallest indivisible unit. Thus, when a compound or operation is recorded "atomically" the parts of a compound operation, are recorded together, as a unit, i.e. atomically, so that information to be recorded about a single transaction is kept together, as a unit. In at least one embodiment, "atomicity" refers to the entire compound operation including both: 1) the original operation against the IT system, such as an object read or write; and 2) the blockchain transaction update to record the operations successful access to the object.

In at least some embodiments, an external system outside of the information technology (IT) system is used to track transactions, so that successful access requests to a particular resource can be tracked regardless of whether those transactions occur at a client device, at a server, at a storage device, or elsewhere. Using an external system can help to ensure atomicity of the entire compound operation composed of the original operation against the IT system, such as object read or write, as well as the Blockchain transaction update to record a successful access. The various techniques and devices for tracking and recording transactions disclosed herein can also prevent missing entries due to log rotation, and intentional or unintentional modification or deletion of log entries.

In various embodiments, a method includes receiving, at a storage system access point, a first access request, which specifies first data, from a client device. The storage system access point attempts to execute the first access request by accessing the first data. The storage system access point also transmits a first message indicating that information corresponding to the first access request is to be recorded by the external audit system. In response to determining that the first data has been successfully accessed and that the information corresponding to the first access request has been successfully recorded by the external audit system, notify the client device that the first access request has been successfully completed.

In some embodiments, a second access request, which specifies second data, is received from the client device is received at the storage system access point. The storage access point system attempts to execute the second access request, and in response to successfully accessing the second data, the storage access point transmits to an external audit system a second message indicating that information corresponding to the second access request is to be recorded by the external audit system. In response to determining that the second data has been successfully accessed, but that that the information corresponding to the second access request has not been recorded by the external audit system, notify the client device that the second access request failed. Note that even though the resource could be accessed, the operation fails because it could not be successfully recorded.

In some embodiments, such as when an access request includes a write request that was successfully performed, but cannot be successfully recorded, the write operation can be rolled back.

In yet other embodiments, the storage system access point receives a third access request from the client device, wherein the third access request specifies third data. But the attempt to execute the third access request fails. In response to failing to successfully access the third data, notifying the client device that the third access request failed. Note that in some such embodiments, not attempt is even made to record the transaction, because the transaction cannot be completed, even if it could be successfully recorded.

In various embodiments, transmitting to an external audit system a message indicating that the information corresponding to the first access request is to be recorded by the external audit system includes transmitting a multi-stage message from the storage system access point to the external audit system. Transmitting the multi-stage message includes transmitting a proposed transaction for storage by the external audit system, and in response to receiving, at the storage system access point, a status message indicating that the information corresponding to the first access request has been successfully stored by the external audit system, transmitting a message indicating that the external audit system is to update a ledger to include an endorsed transaction corresponding to the proposed transaction.

In yet other embodiments, information corresponding to the first access request includes multiple information elements atomically defining a compound operation associated with an access request.

In various implementations, the first access request includes one of a read access request or a write access request, and the external audit system is part of a blockchain network.

In further embodiments, in response to determining that the information corresponding to the first access request has been successfully recorded by the external audit system, recording the first access request in a log maintained by the storage system access point.

In some embodiments, techniques disclosed herein can be implemented using a device that includes a processor configured to implement a storage system access point, and a network interface coupled to the processor. Some embodiments can be realized as a data storage system including a first device including a processor and a network interface, the first device configured to implement a storage system access point, and to operate as a blockchain peer of a blockchain network; at least one network storage device coupled to the first device, the network storage device including a processor, a network interface, and a memory device; and an external audit system coupled to the first device, and including at least one processing device configured to operate as a blockchain orderer for the blockchain network.

The term "blockchain peer" is a term of art, and refers to an element of a blockchain network that can host ledgers and smart contracts, generally. The term "blockchain orderer" is a term of art, and refers generally to an element of a blockchain network that receives transactions containing endorsed transaction proposal responses, and orders those responses into blocks to generate ledger updates that can be consistently applied to a distributed, replicated ledger. As used herein, the terms "blockchain peer" and "blockchain orderer" should be given their customary meaning, as understood by those of ordinary skill in the art of blockchain networks.

DETAILED DESCRIPTION

Figure 1:
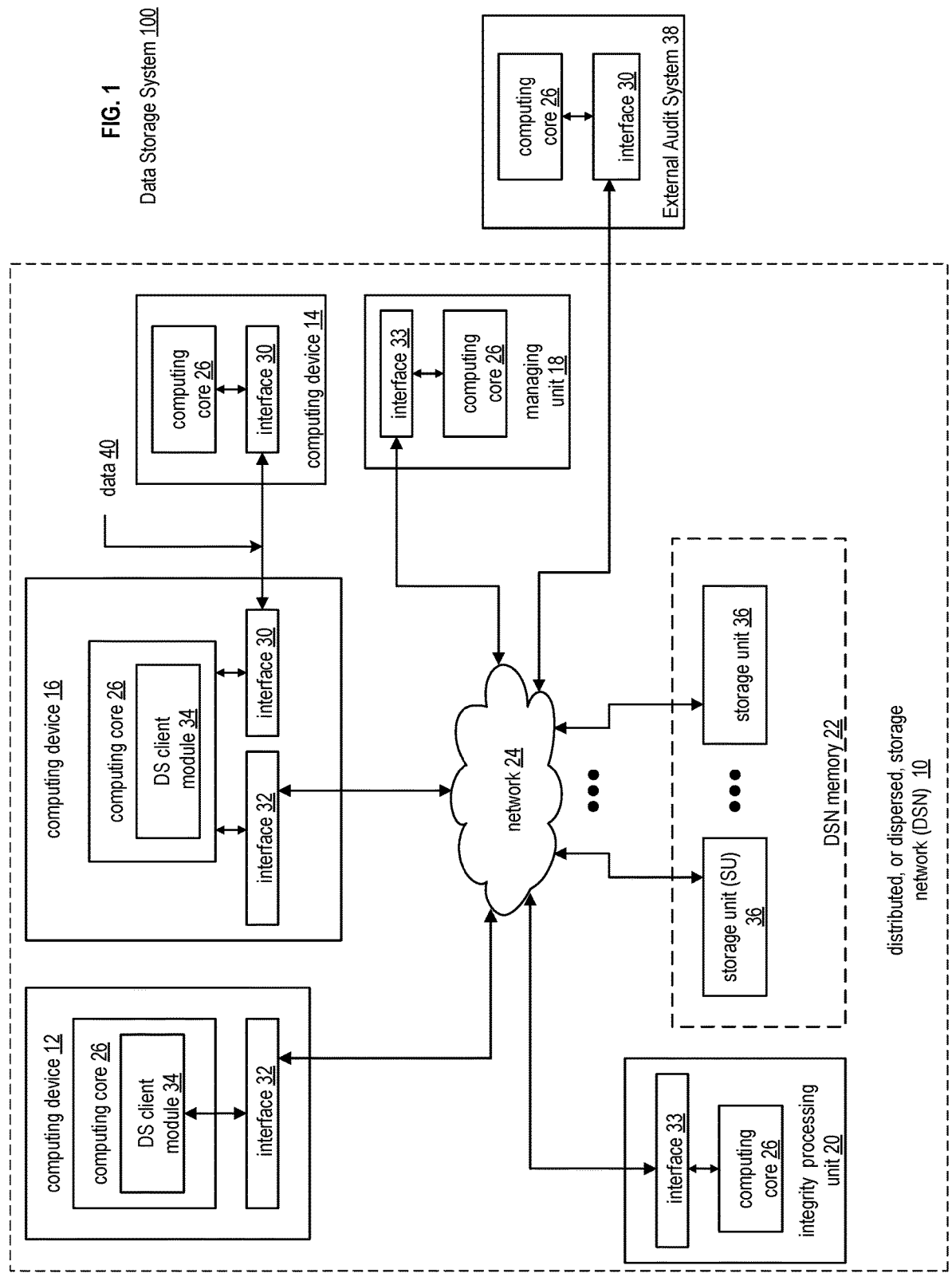
FIG. 1 is a schematic block diagram of an embodiment of a data storage system in accordance with the present invention.

FIG. 1 is a schematic block diagram of an embodiment of a data storage system 100 including a dispersed, or distributed, storage network (DSN) 10 and an external audit system 38. DSN 10 includes a plurality of computing devices 12-16, a managing unit 18, an integrity processing unit 20, and a DSN memory 22. The components of the DSN 10 and external audit system 38 are coupled to a network 24, which may include one or more wireless and/or wire lined communication systems; one or more non-public intranet systems and/or public internet systems; and/or one or more local area networks (LAN) and/or wide area networks (WAN).

Figure 2:
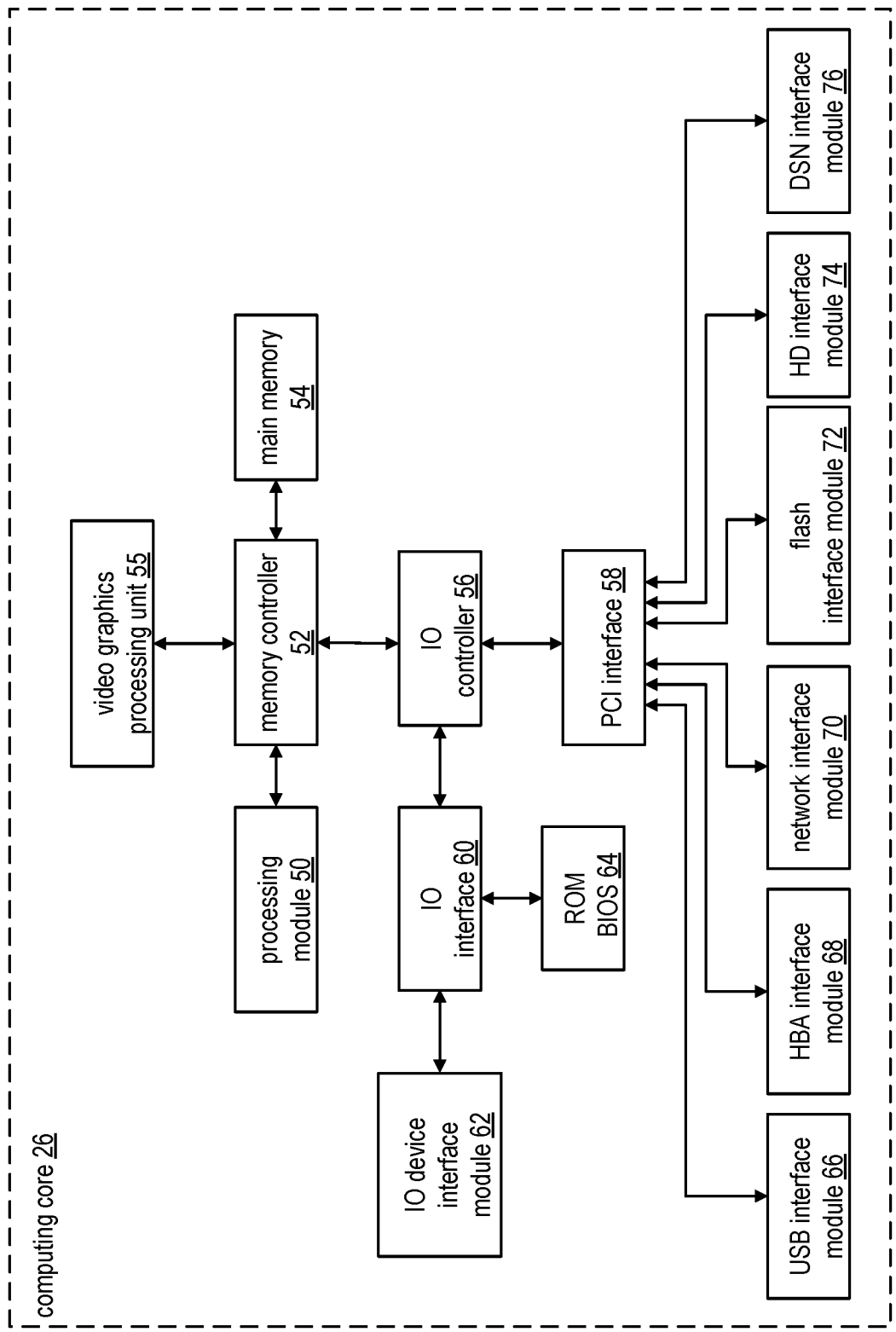
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

External audit system 38 includes one or more processing devices, such as computing core 26, and a network interface such as interface 30. In at least one embodiment, external audit system 38 and one or more devices included in DSN 10 are part of a Blockchain network that can be used to track resource access transactions atomically. The qualifier "external" in the phrase "external audit system" is used herein to specify that auditing functions are controlled by external audit system 38, and are performed, at least partially, outside the system used to access resources, for example DSN 10. Using external auditing system 38 to track transactions provides the ability to track transactions irrespective of where the resources reside, e.g., on-premise, cloud, hybrid-cloud, and so on. Furthermore, using external auditing system 38 to track transactions as discussed herein provides portability for the access information as resources move, e.g. on-premise to the cloud, or get renamed.

In at least one embodiment, a requesting device, for example computing device 12, requests access to data stored in one of the storage units 36, DSN memory 22 acts as storage system access point, and receives the request, and cooperates with external audit system to record successful transactions in an immutable, atomic record using Blockchain techniques, as discussed subsequently in greater detail.

In one or more embodiments, the record stored by the external audit system is a block having the following format:

```
{
  Resource name:<Name of the compute or storage resource: e.g. A
  bucket or object in object storage>
  Resource UUID: <Unique ID for the resource for the life of the
  resource>
```

```
    Type of Access: <Granted access to the resource: E.g. Read or Write
      to a bucket or object in object storage>
    Timestamp: <UTC time of request>
    Username: <The user who was granted access>
    Client Identifier: <UUID>
    Client IP address: <Identifier for the address from where the request
      was received>
    XYZ-Metadata: <Any user provided metadata in the request>
    Hash of previous block: <Hash of the previous block in the
      Blockchain>
}
```

In at least one embodiment, a record can be created or updated for successful requests to access a resource, such as a program, file, object, or the like, regardless of where that resource is located. Thus, a request to access all or part of a resource stored locally in a memory of computing device 12, computing device 14, or computing device 16 can be subject to the same requirements applied to that same resource stored remotely by DSN memory 22. In some such embodiments, external audit system 38 can be used to create an immutable, atomic record transactions local to computing device 12, computing device 14, or computing device 16.

In some embodiments, any of computing device 12, computing device 16, computing device 14, managing unit 18, integrity processing unit 20 and/or DSN memory can serve as a data storage system access point. In some embodiments, another device or service, for example an edge device of DSN 10, (not explicitly illustrated), serves as the data storage system access point. In general, the term "data storage system access point" refers to a device or module that receives a request to access stored objects, and attempts to service the access request by accessing the object directly or indirectly using an intermediary.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interfaces 30-33 of FIG. 1. Note that the IO device interface module 62 and/or the memory interface modules 66-76 may be collectively or individually referred to as IO ports.

Figure 3:
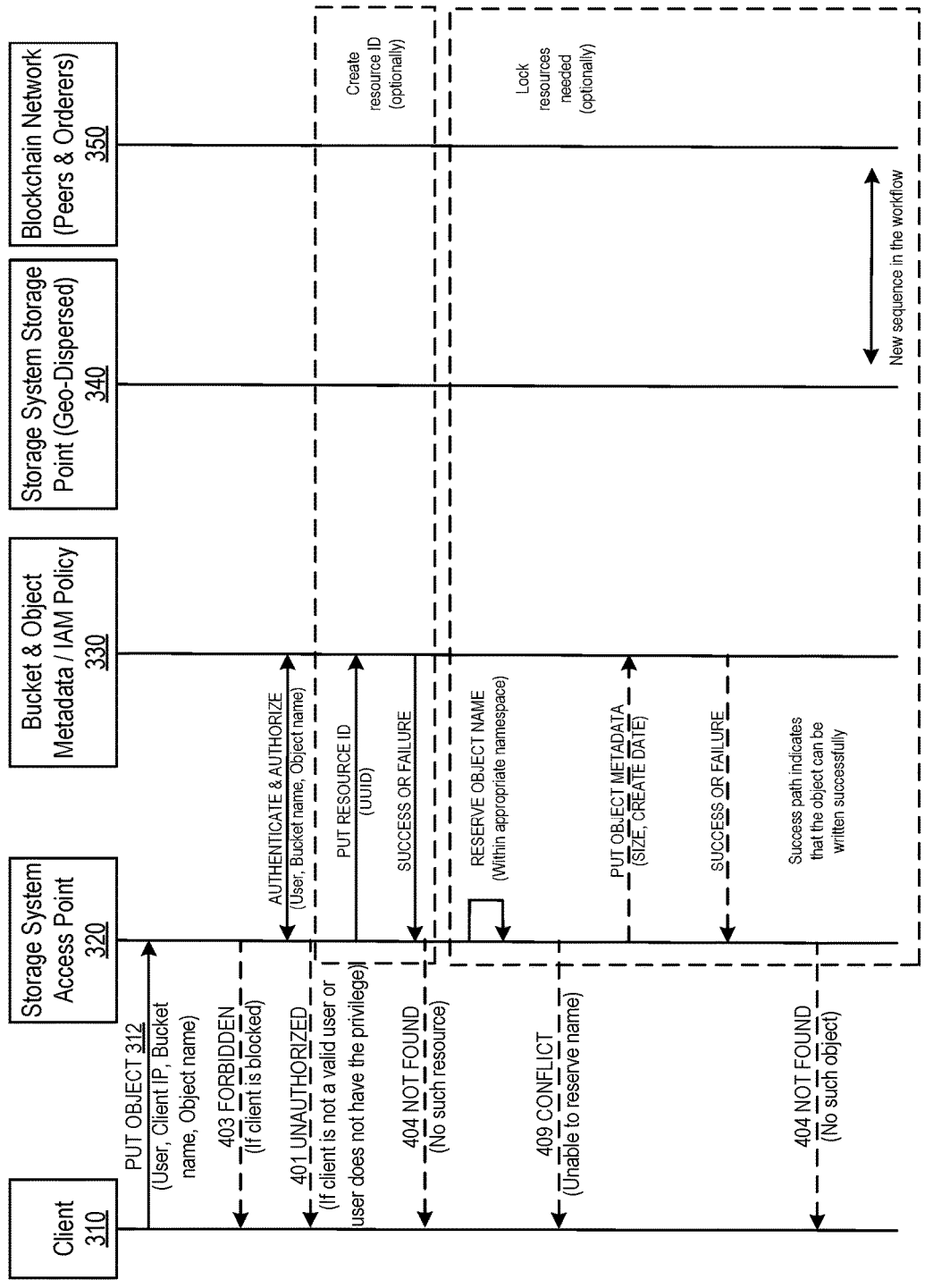
FIGS. 3-5 are sequence diagrams illustrating sequences an atomic object storage write flow in accordance with the present invention.
Figure 4:
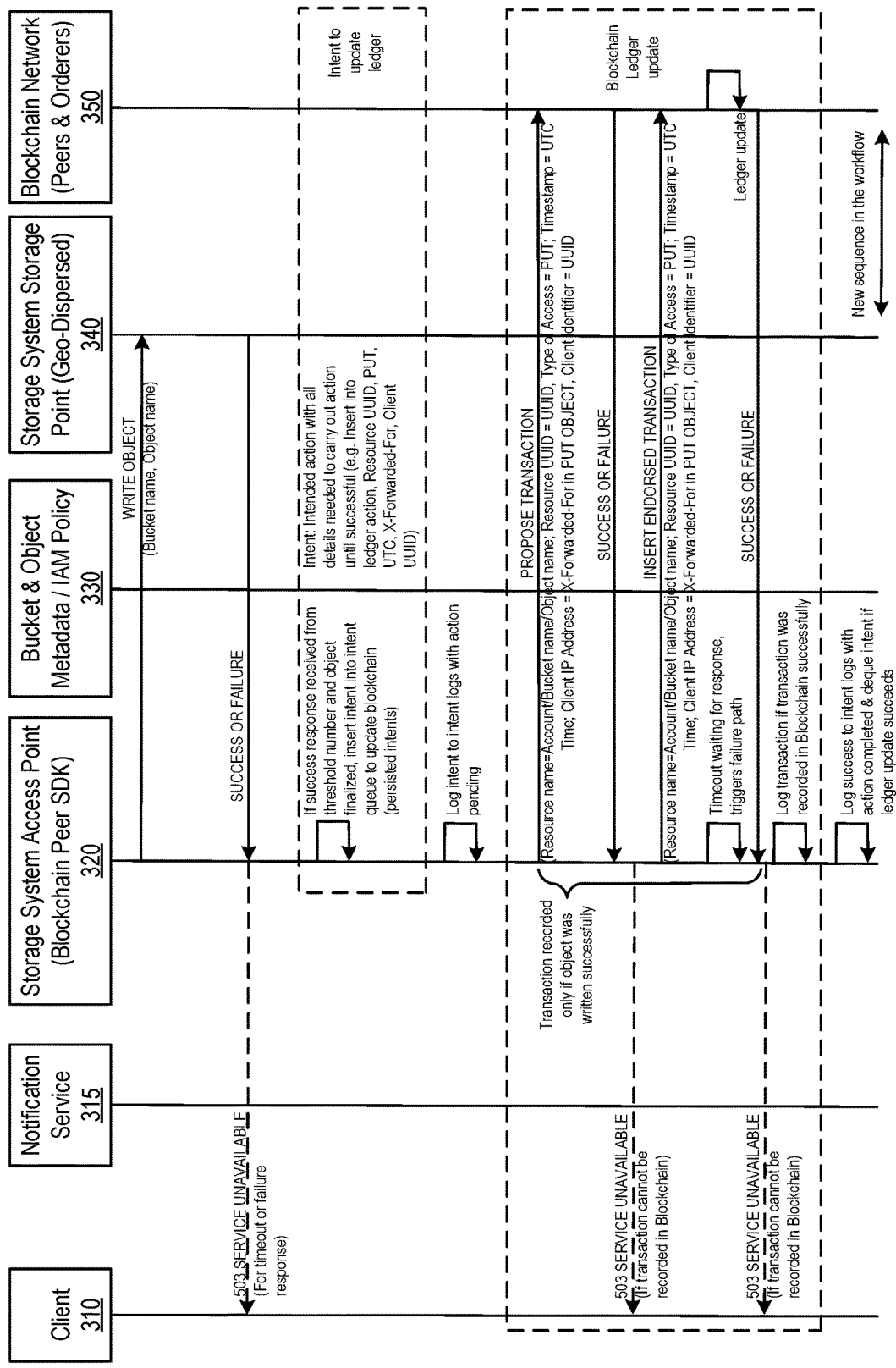
Figure 5:
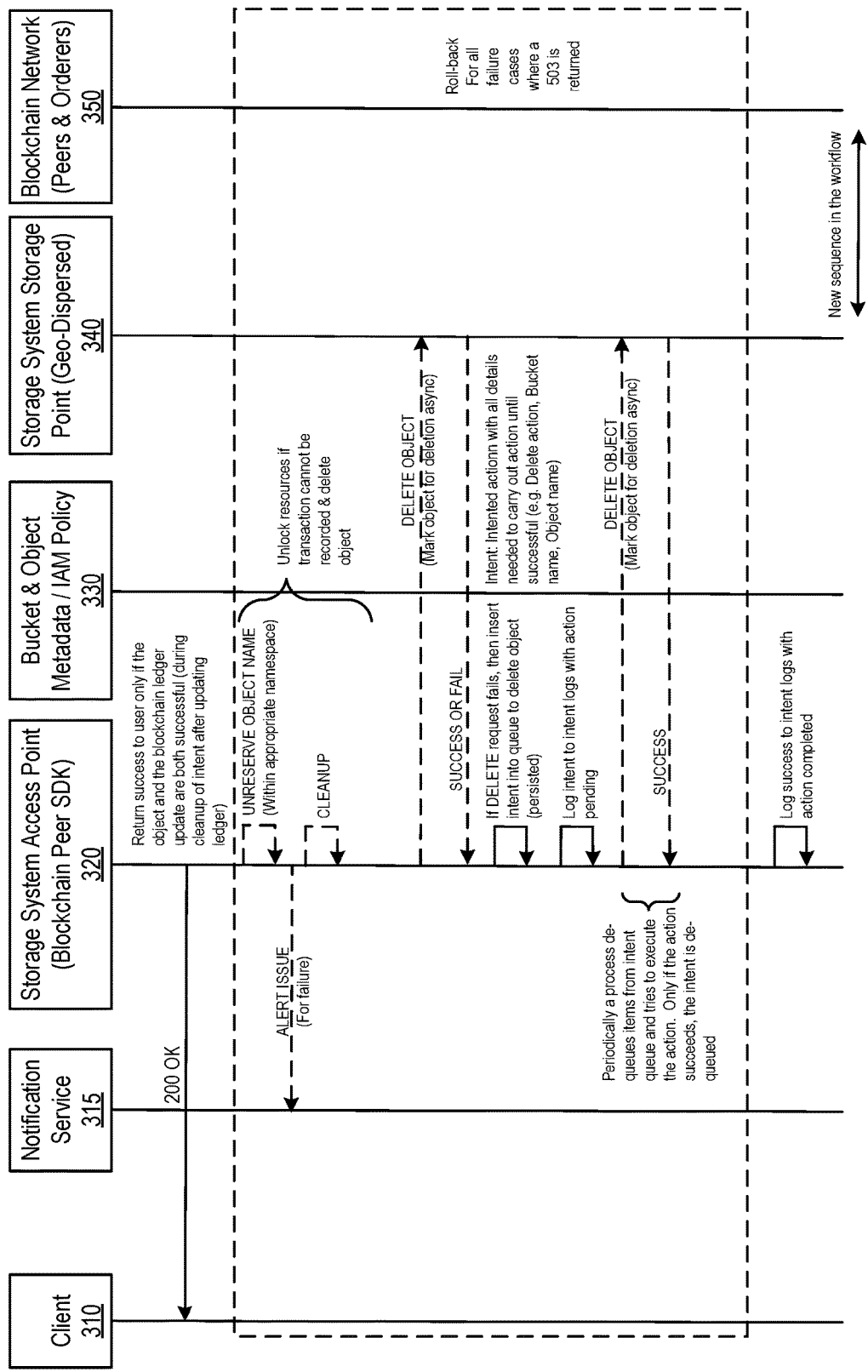

Referring now to FIGS. 3-5, an atomic object storage write flow 300 will be discussed according to various embodiments of the present disclosure. The sequence diagram of FIG. 3 shows information flow between and among various devices and/or modules included in a data storage system, including client 310, storage system access point 320, identity and access management (IAM) module 330, storage system storage point 340 and Blockchain network 350.

Client 310 can be, for example, computing device 12 (FIG. 1), computing device 16 (FIG. 1), computing device 14 (FIG. 1), managing unit 18 (FIG. 1), or some other device or module that requests access to a resource, such as a stored object, an application, a file, or the like. In some embodiments, client 310 can be a peer included in Blockchain network 350.

Storage system access point 320 can be any device or module that serves as an entry point to a storage system. In at least one embodiment DSN memory 22 (FIG. 1) can be a storage system access point, because DSN memory 22 services requests for access to objects or other resources stored in data stored in a storage unit 36 (FIG. 1). In other embodiments, DS client modules 34 (FIG. 1), integrity processing unit 20 (FIG. 1), or managing unit 18 (FIG. 1) can function as the storage system access point. In yet other embodiments, various edge processing devices (not illustrated) can be serve as a storage system access point. In various embodiments multiple storage system access points can be employed, although a single storage system access point 320 is used in the examples presented herein. A device used to implement storage system access point 320 can, in some embodiments, be a part of Blockchain network 350, such as a peer.

IAM module 330 provides authentication and access control, and can be implemented by, for example integrity processing unit 20 (FIG. 1), DSN memory 22 (FIG. 1), managing unit 18 (FIG. 1), or by using a server or other device to implement various bucket and object meta data/ IAM policies. In general, IAM module 330 checks to determine that requestors are who they purport to be (identify) and are allowed to access the requested resources (authorization). In some embodiments, IAM module 330 can be part of Blockchain network 350.

Storage system storage point 340 can be, for example, DSN memory 22 (FIG. 1), storage unit 36 (FIG. 1), cloud storage, a memory locally accessible to a requestor, or some other device or module used for storage and retrieval of resources. In at least one embodiment, storage system storage point is one of multiple storage devices included in a geographically dispersed storage network, such as a network attached storage device, a file server, a physical or logical drive accessible via the file server, a shared local memory of a network connected processing device, or the like. In some embodiments, a device functioning as a storage system storage point 340 is included in Blockchain network 350, for example as a peer.

Blockchain network 350, like other Blockchain networks is a decentralized, distributed network used to implement digital records of transactions across many computers, so that any involved record cannot be altered retroactively, without the alteration of all subsequent blocks. Blockchain network 350 includes peers and orderers, which can be implemented using devices and modules internal to a data storage system served by storage system access point 320, or some combination thereof. For example, in at least one embodiment, Blockchain network 350 includes external audit system 38 (FIG. 1), which in addition to its other functions operates as a peer or an orderer in Blockchain network 350, and storage system access point 320, which in addition to its other functions operates as a peer in Blockchain network 350.

The atomic object storage write flow 300 begins with client 310 transmitting a PUT OBJECT message 312 to storage system access point 320. PUT OBJECT message 312 can include a user identifier, a client Internet Protocol address, a Bucket name (the name of a directory location containing data to be accessed), an Object name (the name of an Object to be accessed), or the like. If client 310 is blocked from communicating with storage system access point 320, a 403 FORBIDDEN error can be returned in response to the PUT OBJECT message 312.

If communication between client 310 and storage system access point 320 is not blocked, storage system access point 320 sends an authentication & authorization request to IAM module 330. The authentication & authorization request can include user information, the bucket name, and the object name. If the authentication or authorization fail because the user is not valid, or because the user does not have the necessary privileges, storage system access point 320 can transmit a 401 UNAUTHORIZED error message to client 310.

A PUT RESOURCE ID message can be transmitted to IAM 330 identifying the resource to be written, as specified by PUT OBJECT message 312. If the identified resource is a new resource, storage system access point 320 can optionally attempt to create a new Universal Unique ID (UUID) for the resource using the PUT RESOURCE ID message.

In response to the PUT RESOURCE ID message a SUCCESS OR FAILURE message will be returned to storage system access point 320. If the UUID of the resource to be written is located by IAM module 330, either because it already existed or because it was newly created, the message will indicate SUCCESS. Otherwise, if the UUID cannot be found and no new UUID was created, a FAILURE message will be transmitted to storage system access point 320, which will in turn transmit an appropriate message, such as 404 NOT FOUND, to client 310.

So far in this example, client 310 has been authenticated and authorized, and a UUID associated with the resource to be written has been found. At this point, the object name associated with the UUID can be reserved within the appropriate namespace by storage system access point 320. If the object name is unable to be reserved, storage system access point 320 can transmit an appropriate message, such as a 409 CONFLICT error, to client 310.

Optionally, the resources necessary to accomplish the write operation can be locked by the appropriate device. For example, storage system access point 320 can transmit write-lock messages to particular storage devices, IAM module 330 can return authorization failures in response to other PUT OBJECT messages identifying the same resource, or the like.

In at least one embodiment, locking the resource includes transmitting a PUT OBJECT METADATA message from storage system access point 320 to IAM module 330. The PUT OBJECT METADATA message can include information indicating the size and creation date of the new resource. IAM module 330 can transmit a SUCCESS OR FAILURE message back to storage system access point 320, indicating whether the necessary resources could be locked.

If IAM module 330 is unable to successfully lock the necessary resources, storage system access point 320 can notify client 310 of the failure by transmitting an appropriate message, such as 404 NOT FOUND.

Referring next to FIG. 4, another sequence in atomic object storage write flow 300 will be discussed in accordance with various embodiments of the present invention. In addition to client 310, storage system access point 320, identity and access management (IAM) module 330, storage system storage point 340 and Blockchain network 350, the sequence illustrated in FIG. 4 also illustrates notification service 315.

In at least some embodiments, notification service 315 can be used to control how and when various notifications and failure, error, and success messages are provided to client 310. Notification service 315 is, in at least one embodiment, a push notification service that receives notification messages from storage system access point 320, and provides those notifications to client 310. Notification service 315 can forward notifications received without substantive modification, so that the content of received notifications is maintained, even if the message is repackaged for transmission. In some implementations, notifications can be provided to multiple different destinations concurrently, and/or multiple notifications can be packaged into a single notification message.

Notification service can provide the notifications by encapsulating and forwarding notifications received from storage system access point 320 generating new notifications, modifying the content of received notifications based on an intended destination of the notification, delaying or preventing a notification from being delivered until certain conditions are met, or the like. For example, in at least one embodiment, delivery of certain success or failure notifications related to an access request can be delayed until a confirmation is received from a Blockchain confirming that the access transaction has been recorded.

In at least one embodiment, the sequence illustrated in FIG. 4 occurs after a write request has been received, the requestor has been authenticated and authorization has been verified, a new UUID has been created (optional), the object name to be written to has been reserved within the appropriate namespace, and resources associated with the write request have been locked (optional), as illustrated by FIG. 3.

The sequence of atomic object storage write flow illustrated in FIG. 4 begins with system access point 320, transmitting a Write Object request to storage system storage point 340, which can include a bucket name and an object name. Storage system storage point 340 processes the request and returns a Success or Failure message to storage system access point 320. If the Success or Failure message indicates that the write failed for any reason, or if the write service is unavailable, storage system access point 320 transmits a Service Unavailable message 503 to client 310. The service unavailable message can be sent from storage system access point 320 directly to client 310, or via notification service 315. Importantly, in various embodiments storage system access point 320 will not yet notify client 310 if the write was successful.

In various embodiments, a determination that an object has been successfully written can be determined based on receiving success responses from a write-threshold number storage units included in a geographically dispersed storage network configured to store encoded data slices that can be recombined to recover an original piece of data or object, but where each individual encoded data slice is insufficient to recover the original piece of data or object. In other embodiments, especially those in which recovery of a single piece of encrypted data is sufficient to recover the original, unencrypted piece of data, a single success response can be sufficient to indicate success.

If storage system access point 320 determines that storage system storage point 340 was able to successfully write the object identified in the Write Object command, storage system access point 320 issues an intent to update a blockchain ledger. The term "intent" is a term of art, well understood by those of ordinary skill in the art.

Issuing the intent can be performed by storage system access point 320. In at least one embodiment, issuing an intent includes issuing a persisted intent by inserting the intent into an intent queue to update a blockchain. An intent inserted into the intent queue includes details needed to carry out the intended action until it can be determined that the intended action has been successfully completed. For example, an intent can, e.g. Insert into ledger action, Resource UUID, PUT, UTC, X-Forwarded-For, Client UUID, and/or the like. PUT refers to a type of access, for example a PUT in the case of a write operation and a GET in the case of a read operation. UTC refers to coordinated universal time. X-Forwarded-For is a is a header field commonly used method for identifying an originating IP address of a client connecting through a proxy or load balancer.

After issuing the intent, the storage system access point 320 logs the intent to an intentions log with other pending actions. After logging the intent, storage system access point 320 transmits to blockchain network 350 a proposal to update the Blockchain ledger with information about the proposed transaction, which in this case is a Write Object operation. The message can include a Resource name, such as an Account identifier, a Bucket name, and/or an Object name; a Resource identifier in the form of a UUID; a Type of Access, which in the case of a write operation can be a PUT; a Timestamp, e.g. a UTC Time; a Client IP Address, indicated by the X-Forwarded-For in the PUT OBJECT; and a Client Identifier in the form of a UUID.

Blockchain network 350 responds to storage system access point 320 with a Success or Failure message indicating whether or not the proposed transaction was successfully recorded in the Blockchain ledger. If the proposed transaction cannot be recorded by Blockchain network 350, Service Unavailable message 503 is sent to client 310. If, however, the proposed transaction is successfully recorded by Blockchain network 350, storage system access point 320 transmits an Insert Endorsed Transaction message to Blockchain network 350, and waits for the Blockchain ledger to be updated by Blockchain network 350.

Blockchain network 350 responds to storage system access point 320 with a Success or Failure message indicating whether or not the endorsed transaction was successfully recorded in the Blockchain ledger. If Blockchain network 350 cannot successfully update the Blockchain ledger to include the endorsed transaction, or if storage system access point 320 does not receive a response within a timeout period, the failure path is triggered and a Service Unavailable message 503 can be sent to client 310.

At this point, assuming everything has been successful to this point, storage system access point 320 logs the transaction as successfully recorded in Blockchain, and logs a "Success" event to the intent logs with an action completed, and de-queues the intent.

Referring next to FIG. 5, another sequence of atomic object storage write flow 300 is illustrated and discussed according to various embodiments. If the sequences illustrated in FIGS. 4 and 5 have been successful, meaning that that the object to be written has been successfully written by storage system storage point 340 and the Blockchain ledger has been successfully updated by Blockchain network 350, storage system access point 320 transmits an OK message 200 to client 310, indicating that the write was successful. In at least one embodiment, OK message 200 can be transmitted during cleanup of the intent after the ledger has been updated. However, in at least some embodiments, the client is not notified that the write is successful unless the object was written to storage and the Blockchain ledger was successfully updated.

In some cases, the object write may have been successful, but the Blockchain ledger update may have failed. In at least some embodiments, data written as part of a transaction that cannot not be recorded in the Blockchain ledger is considered suspect. In those cases, as illustrated by FIG. 5, the write operation will be rolled back. Note that in cases where the write operation is rolled back, as far as the client knows, the write operation was unsuccessful.

To roll back the write operation, storages system access point 320 can unlock any previously locked resources by un-reserving the object name, and perform other clean-up operations, for example by deleting the data object(s) already written to storage. If the object name cannot be unreserved, or if other failures occur, storage system access point 320 can transmit an Alert Issue notification to notification service 315. Although not specifically illustrated, the notification service 315 can transmit message to appropriate personnel or systems so that corrective action can be taken.

Deleting the object can include sending a message from storage system access point 320 to storage system storage point 340. A Delete Object message can include instructions to immediately delete the object, or mark the object for deletion asynchronously during a later scheduled cleanup operation. For example, where storage system access point 320 is implemented by managing unit 18 (FIG. 1), the Delete Object message can be transmitted to DSN memory 22 (FIG. 1), or to integrity processing unit 20 (FIG. 1), which can forward the message to DSN memory 22.

Storage system storage point 340 can notify storage system access point 320 regarding the success or failure of the delete objection. If the delete operation fails, storage system access point 320 can insert an intent to delete the object into an intent queue, and log the intent into an intent log. A process running on storage system access point 320 can attempt to process items in the intent queue periodically and/or upon the occurrence of a trigger event, such as the queue reaching a predetermined size. Items successfully completed can be removed from the queue. Items not completed successfully can remain in the intent queue, and additional attempts can be made later.

Upon successfully rolling back write transactions not successfully recorded in the Blockchain ledger, storage system access point 320 can log a success to the intent logs.

Figure 6:
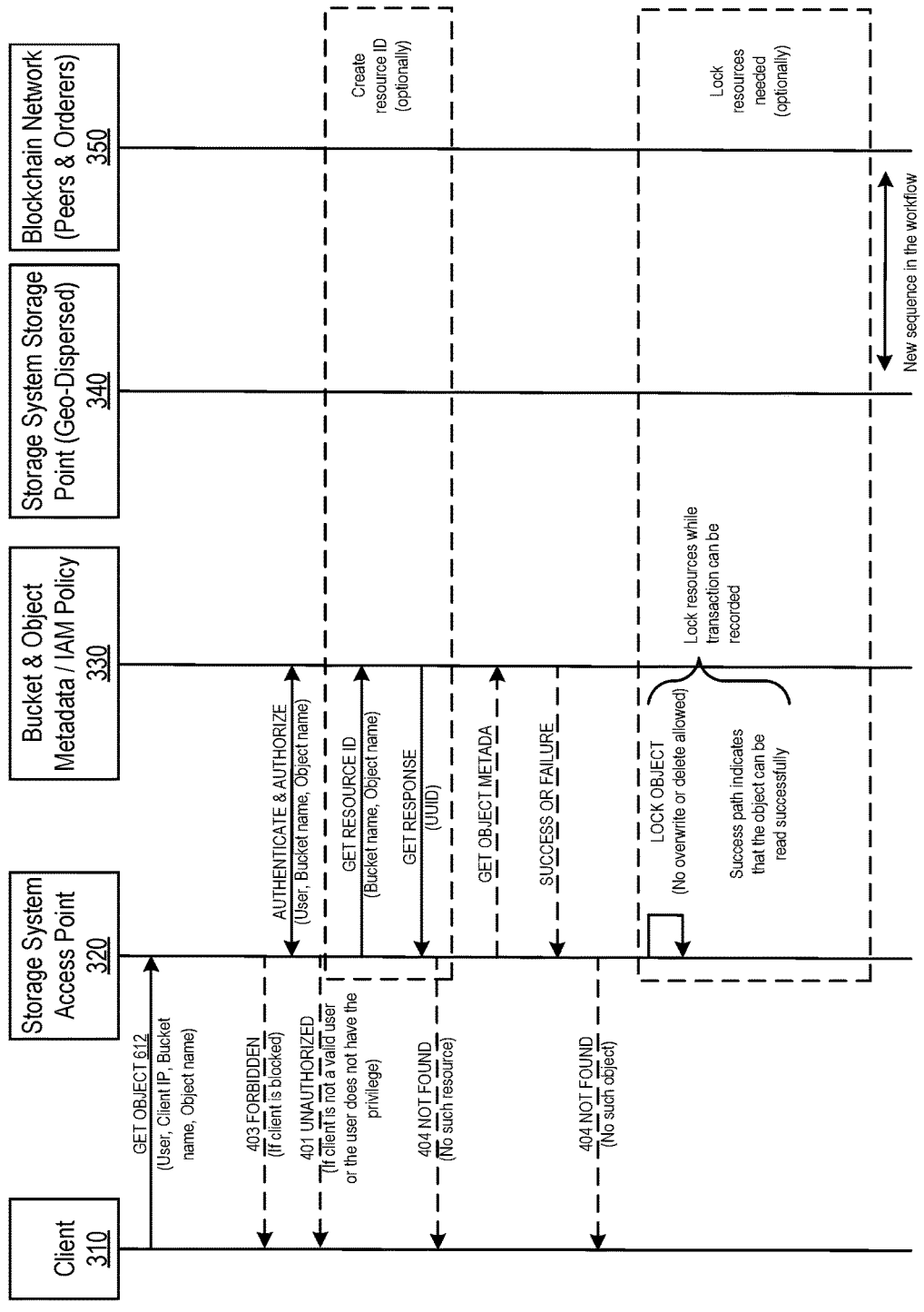
FIGS. 6-8 are sequence diagrams illustrating sequences of an atomic object storage read flow in accordance with the present invention.
Figure 7:
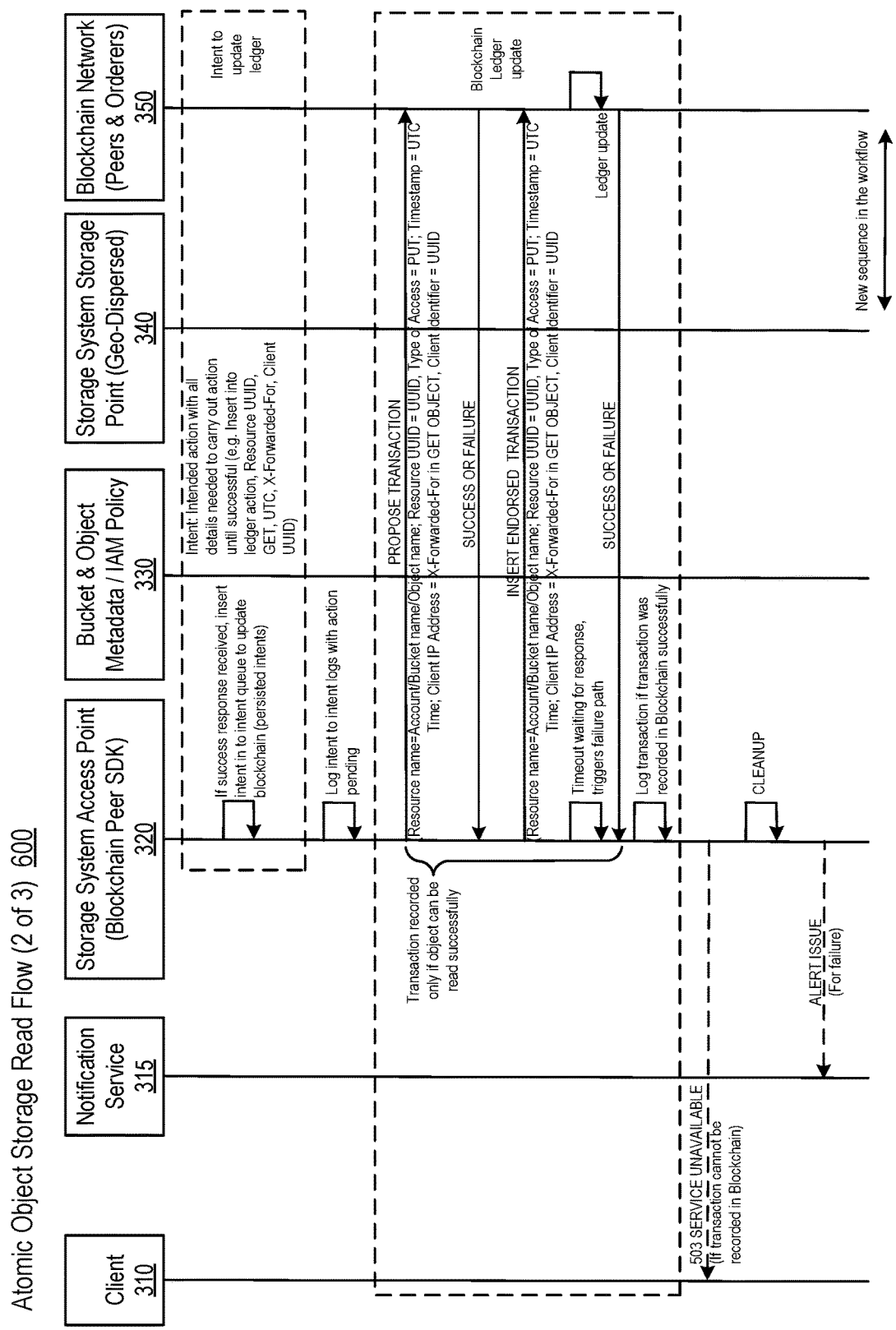
Figure 8:
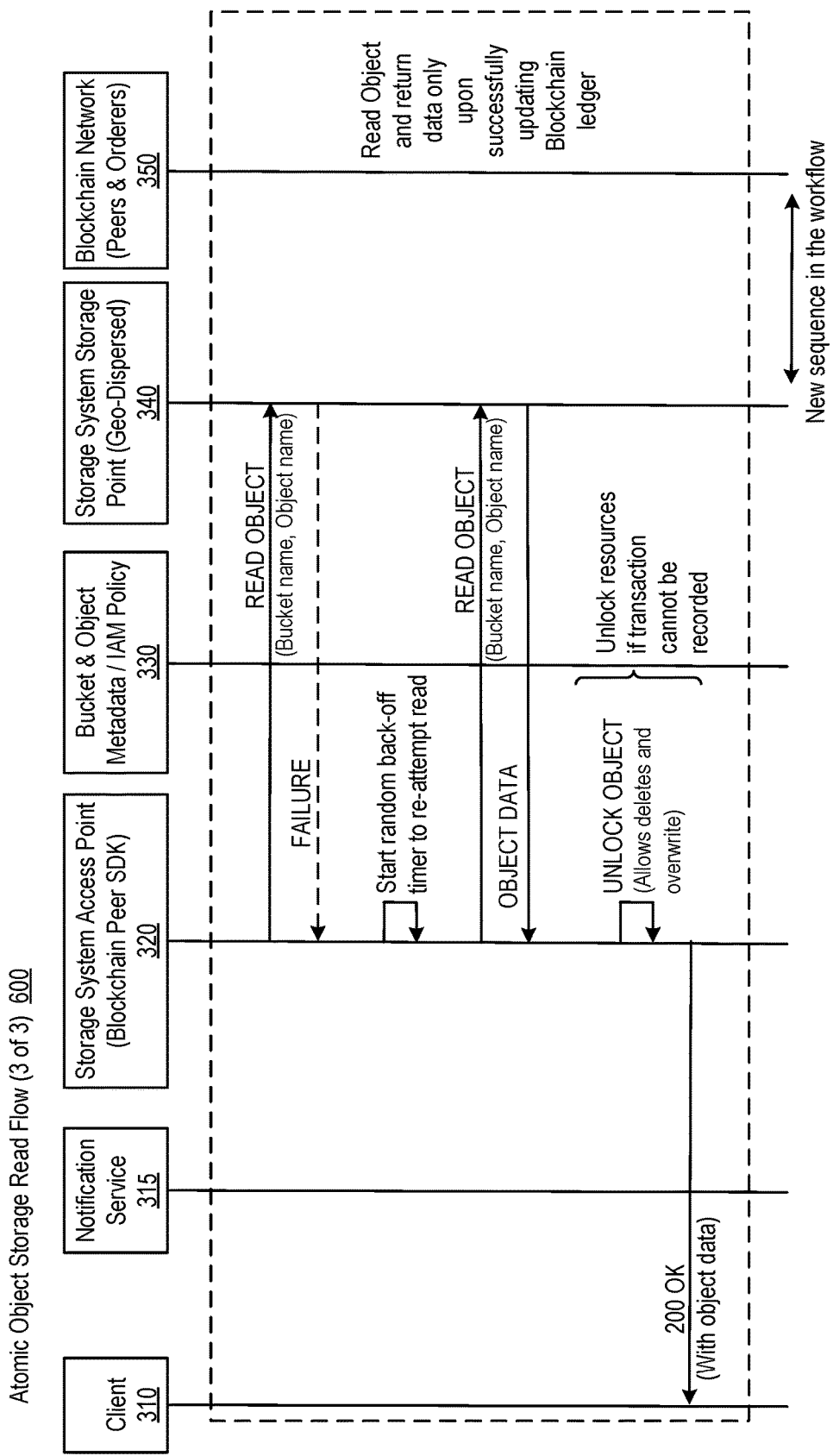

Referring next to FIGS. 6-8 The atomic object storage read flow 600 begins with client 310 transmitting a GET OBJECT message 612 to storage system access point 320. GET OBJECT message 612 can include a user identifier, a client Internet Protocol address, a Bucket name (the name of a directory location containing data to be accessed), an Object name (the name of an Object to be accessed), or the like. If client 310 is blocked from communicating with storage system access point 320, a 403 FORBIDDEN error can be returned in response to the GET OBJECT message 612.

If communication between client 310 and storage system access point 320 is not blocked, storage system access point 320 sends an authentication & authorization request to IAM module 330. The authentication & authorization request can include user information, the bucket name, and the object name. If the authentication or authorization fail because the user is not valid, or because the user does not have the necessary privileges, storage system access point 320 can transmit a 401 UNAUTHORIZED error message to client 310.

A GET RESOURCE ID message can be transmitted to IAM 330 identifying the resource to be read, as specified by GET OBJECT message 612. The GET RESOURCE ID message can include a bucket name and an object name. If the identified resource is not associated with a Universal Unique ID (UUID), storage system access point 320 can optionally attempt to create a new Universal Unique ID (UUID) for the resource using the information in the GET RESOURCE ID message.

In response to the GET RESOURCE ID message a GET RESPONSE message will be returned to storage system access point 320. If the UUID of the resource to be read is located by IAM module 330, the message will indicate the UUID of the requested resource. Otherwise, if the UUID cannot be found, a FAILURE message will be transmitted to storage system access point 320, which will in turn transmit an appropriate message, such as 404 NOT FOUND, to client 310.

In at least one embodiment, storage system access point 320 transmits a GET OBJECT METADATA message to IAM module 330. IAM module 330 can transmit a SUCCESS OR FAILURE message back to storage system access point 320, indicating whether the OBJECT METADATA can be obtained. If the objects metadata cannot be obtained, a 404 NOT FOUND message can be transmitted, to client 310.

Optionally, the resources necessary to accomplish the read operation can be locked by the storage system access point to prevent the object from being overwritten or deleted. In at least one embodiment, the object is locked during a time period when transaction is being recorded.

Referring next to FIG. 7, another sequence in atomic object storage read flow 600 will be discussed in accordance with various embodiments of the present invention. In addition to client 310, storage system access point 320, identity and access management (IAM) module 330, storage system storage point 340 and Blockchain network 350, the sequence illustrated in FIG. 7 also includes notification service 315.

In at least some embodiments, notification service 315 can be used to control how and when various notifications and failure, error, and success messages are provided to client 310 or other devices. Storage system access point 320 can issue an intent to update a blockchain ledger in response to successfully authenticating and verifying authorization of client 310, obtaining object meta data, and (optionally) locking resources associated with the read request have been locked (optional).

In at least one embodiment, issuing an intent includes issuing a persisted intent by inserting the intent into an intent queue to update a blockchain. An intent inserted into the intent queue includes details needed to carry out the intended action until it can be determined that the intended action has been successfully completed. For example, an intent can, e.g. Insert into ledger action, Resource UUID, GET, UTC, X-Forwarded-For, Client UUID, and/or the like.

After issuing the intent, the storage system access point 320 logs the intent to an intentions log with other pending actions. After logging the intent, storage system access point 320 transmits to blockchain network 350 a proposal to update the Blockchain ledger with information about the proposed transaction, which in this case is a GET OBJECT operation. The message can include a Resource name, such as an Account identifier, a Bucket name, and/or an Object name; a Resource identifier in the form of a UUID; a Type of Access, which in the case of a read operation can be a GET; a Timestamp, e.g. a UTC Time; a Client IP Address, indicated by the X-Forwarded-For in the GET OBJECT; and a Client Identifier in the form of a UUID.

Blockchain network 350 responds to storage system access point 320 with a Success or Failure message indicating whether or not the proposed transaction was successfully recorded in the Blockchain ledger. If the proposed transaction cannot be recorded in Blockchain network 350, Service Unavailable message 503 is sent to client 310. If, however, the proposed transaction is successfully recorded by Blockchain network 350, storage system access point 320 transmits an Insert Endorsed Transaction message to Blockchain network 350, and waits for the Blockchain ledger to be updated by Blockchain network 350.

Blockchain network 350 responds to storage system access point 320 with a Success or Failure message indicating whether or not the endorsed transaction was successfully recorded in the Blockchain ledger. If Blockchain network 350 cannot successfully update the Blockchain ledger to include the endorsed transaction, or if storage system access point 320 does not receive a response within a timeout period, the failure path is triggered and a Service Unavailable message 503 can be sent to client 310.

If everything has been successful to this point, storage system access point 320 logs the transaction as successfully recorded in Blockchain, and logs a "Success" event to the intent logs with an action completed.

Referring next to FIG. 8, another sequence of atomic object storage read flow 600 is illustrated and discussed according to various embodiments. In various embodiments, the object is read from storage and returned to client 310 contingent upon successfully updated the Blockchain ledger. Thus, after Blockchain ledger has been updated, storage system access point 320 transmits a READ OBJECT message to storage system storage point 340.

From the previous sequences illustrated in FIGS. 6 and 7, it is already known that the object exists, and its UUID is known, and that the transaction has been written to the Blockchain ledger. So, if the read operation fails, in at least some embodiments a random back-off timer is started, and another attempt to read the object is performed upon expiration of the back-off timer. In response to a successful read operation, the Object Data is transmitted from storage system storage point 340 to storage system access point 320, which transmits the Object Data to client 310 in OK message 200. Storage system 320 can, in some embodiments, unlock the object to allow deletion and overwriting if a transaction cannot be recorded or after the Object data has been obtained.

Figure 9:
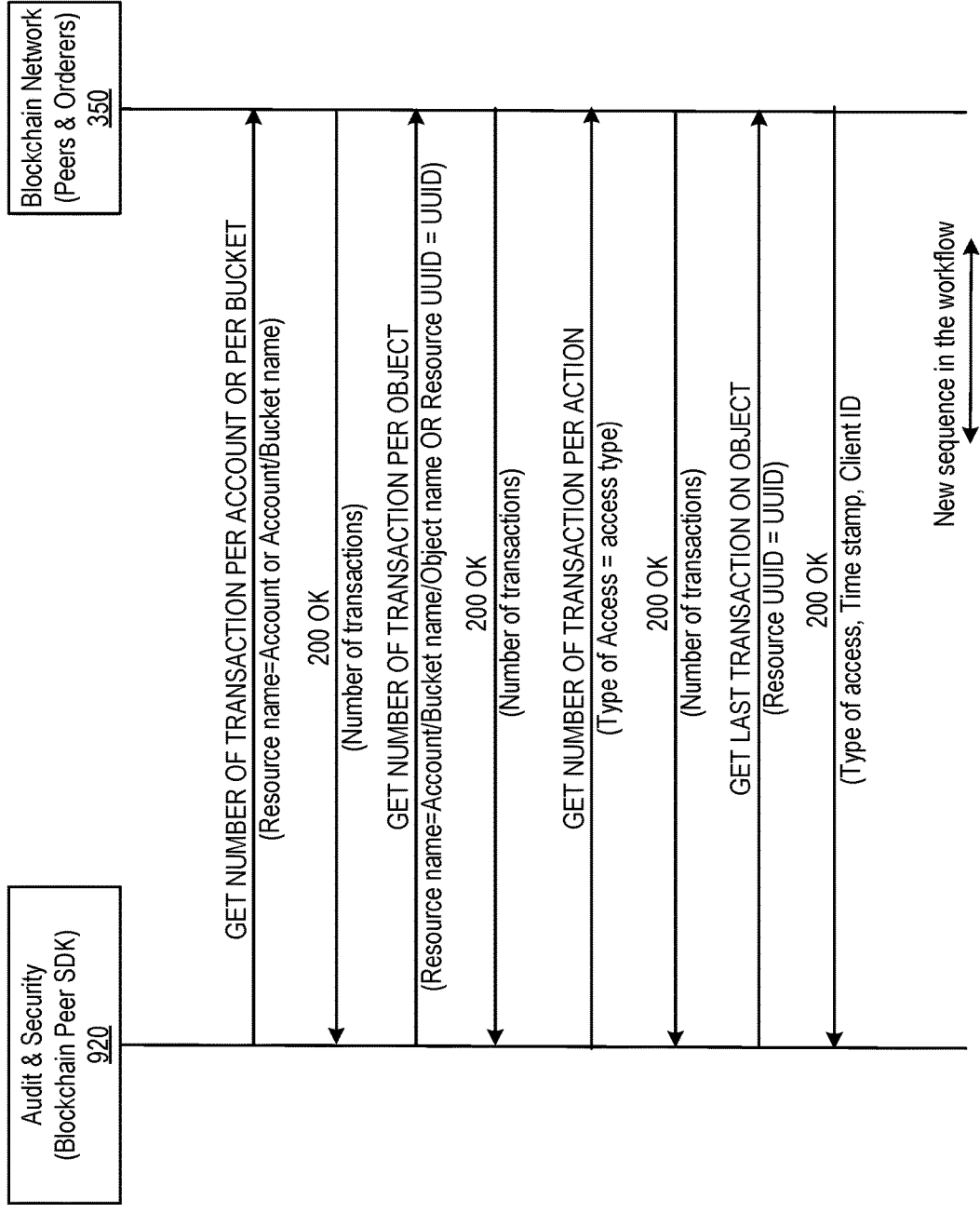
FIG. 9 is a sequence diagram illustrating an auditability & security sequence flow in accordance with the present invention.

Referring next to FIG. 9, an Auditability & Security Sequence Flow 900 illustrating a workflow between an Audit and Security Module 920 and a Blockchain network 350 will be discussed in accordance with various embodiments of the present disclosure. Note that the Audit and Security Module 920 can execute a Blockchain peer software development kit (SDK), which can allow Audit and Security Module 920 to function as one of the peers in Blockchain network 350. In at least one embodiment, Auditability & Security Sequence Flow 900 allows auditing of access transactions without requiring transaction data to be anonymized.

Audit and Security Module 920 transmits a GET NUMBER OF TRANSACTIONS PER ACCOUNT OR BUCKET message to Blockchain network 350. This message can obtain the number of transactions per bucket, per account, or both by specifying the resource name as an account number and/or a bucket name. In response to the GET NUMBER OF TRANSACTIONS PER ACCOUNT OR BUCKET message, Blockchain network 350 returns message 200 OK, which includes the requested number of transactions.

Auditability & Security Sequence Flow 900 can also be used to obtain the number of transactions per object by transmitting a GET NUMBER OF TRANSACTION PER OBJECT message that includes a resource name. The resource name can be an account number or name, a bucket name, an object name, or a resource UUID. In response to the GET NUMBER OF TRANSACTION PER OBJECT message Blockchain network 350 returns message 200 OK, which includes the requested number of transactions.

Auditability & Security Sequence Flow 900 can also be used to obtain the number of transactions per action by transmitting a GET NUMBER OF TRANSACTION PER ACTION message that includes resource type, such as GET (read), or PUT (write). In response to the GET NUMBER OF TRANSACTION PER ACTION message Blockchain network 350 returns message 200 OK, which includes the requested number of transactions.

Get Last Transaction on Object

Auditability & Security Sequence Flow 900 can also be used to obtain the number of transactions per object by transmitting a GET LAST TRANSACTION ON OBJECT message that includes a resource UUID. In response to the GET LAST TRANSACTION ON OBJECT message Blockchain network 350 returns message 200 OK, which includes the transaction type associated with the last transaction, a timestamp indicating a time associated with the last transaction, and a client ID indicating who last accessed the object.

Figure 10:
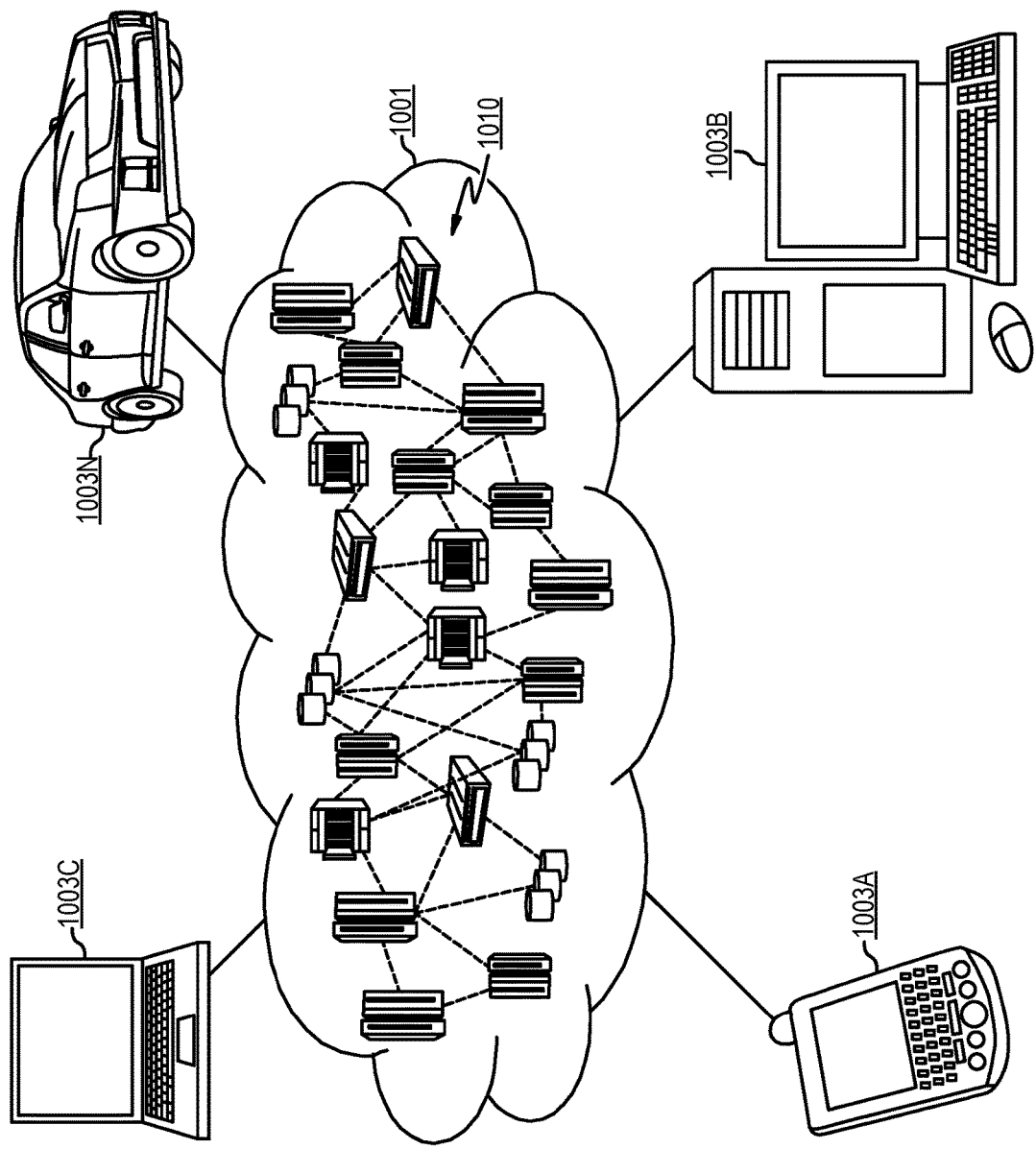
FIG. 10 depicts a cloud computing environment according to various embodiments of the present invention.

FIG. 10 depicts a cloud computing environment according to various embodiments of the present invention. FIG. 10 presents an illustrative cloud computing environment 1001. As shown, cloud computing environment 1001 includes one or more cloud computing nodes 1010 with which local computing devices used by cloud consumers, such as, for example, personal digital assistant (PDA) or cellular telephone 1003A, desktop computer 1003B, laptop computer 1003C, and/or automobile computer system 1003N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1001 to offer infrastructure, platforms and/or software as services for which a cloud consumer does not need to maintain resources on a local computing device. It is understood that the types of computing devices 1003A-N shown in FIG. 10 are intended to be illustrative only and that computing nodes 1010 and cloud computing environment 1001 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
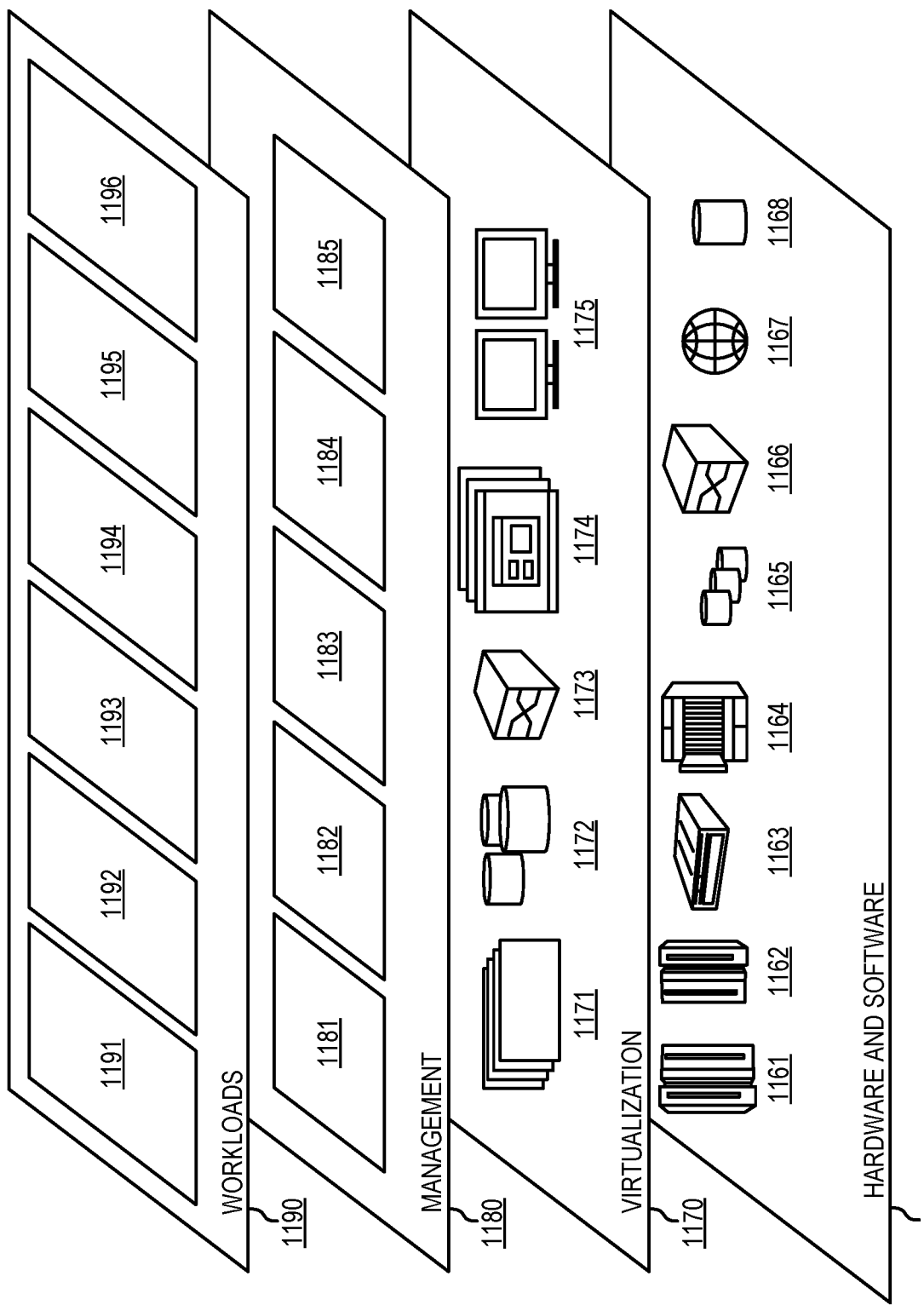
FIG. 11 depicts abstraction model layers according to various embodiments of the present invention.

FIG. 11 depicts abstraction model layers according to various embodiments of the present invention. Referring now to FIG. 11, a set of functional abstraction layers provided by cloud computing environment 1001 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168. In some embodiments, one or more hardware components can be implemented by utilizing the computing core 26 of FIG. 2.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and optimizing data access of storage devices to account for wear leveling 1196.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
   receiving, at a storage system access point, a first access request from a client device, wherein the first access request specifies first data;
   attempting to execute the first access request;
   transmitting to an external audit system a first message indicating that information corresponding to the first access request is to be recorded by the external audit system, wherein the transmitting to the external audit system the first message indicating that the information corresponding to the first access request is to be recorded by the external audit system includes:
   transmitting a multi-stage message from the storage system access point to the external audit system, wherein transmitting the multi-stage message includes:
      transmitting a proposed transaction for storage by the external audit system; and
      in response to receiving, at the storage system access point, a status message indicating that the information corresponding to the first access request has been successfully stored by the external audit system, transmitting a message indicating that the external audit system is to update a ledger to include an endorsed transaction corresponding to the proposed transaction; and
   in response to determining that the first data has been successfully accessed and that the information corresponding to the first access request has been successfully recorded in a blockchain ledger by the external audit system, notifying the client device that the first access request has been successfully completed, wherein the notifying the client is contingent upon the determining that the information corresponding to the first access request has been successfully recorded in the blockchain ledger by the external audit system.

2. The method of claim 1, further comprising:
   receiving, at the storage system access point, a second access request from the client device, wherein the second access request specifies second data;
   attempting to execute the second access request;
   transmitting to the external audit system a second message indicating that information corresponding to the second access request is to be recorded by the external audit system; and
   in response to determining that the second data has been successfully accessed, but that information corresponding to the second access request has not been recorded by the external audit system, notifying the client device that the second access request failed.

3. The method of claim 2, further comprising:
   wherein the second access request is a write request, and successfully accessing the second data includes performing a write operation associated with the second data; and
   further in response to determining that the information corresponding to the second access request has not been recorded by the external audit system, rolling back the write operation associated with the second data.

4. The method of claim 2, further comprising:
   receiving, at the storage system access point, a third access request from the client device, wherein the third access request specifies third data;
   attempting to execute the third access request; and
   in response to failing to successfully access the third data, notifying the client device that the third access request failed.

5. The method of claim 1, wherein the information corresponding to the first access request includes:
   a plurality of information elements atomically defining a compound operation associated with the first access request.

6. The method of claim 1, wherein:
   the first access request includes one of a read access request or a write access request; and
   the external audit system is part of a blockchain network.

7. The method of claim 1, further comprising:
   in response to determining that the information corresponding to the first access request has been successfully recorded by the external audit system, recording the first access request in a log maintained by the storage system access point.

8. The method of claim 1, further comprising issuing, by the storage system access point, a persistent intent by inserting an intent into an intent queue to update the blockchain.

9. A device comprising:
   a processor configured to implement a storage system access point;
   a network interface coupled to the processor and configured to receive a first access request from a client device coupled to the storage system access point via a communications network, wherein the first access request specifies first data;
   the storage system access point configured to:
      attempt to execute the first access request;
      transmit to an external audit system, via the network interface, a first message indicating that information corresponding to the first access request is to be recorded by the external audit system;
      transmit a multi-stage message to the external audit system, wherein transmitting the multi-stage message includes:
         transmitting a proposed transaction for storage by the external audit system; and
         in response to receiving a status message indicating that the first access request has been successfully stored by the external audit system, transmitting a message indicating that the external audit system is to update a blockchain ledger to include an endorsed transaction corresponding to the proposed transaction;
      determine that the information corresponding to the first access request has been successfully recorded in the blockchain ledger by the external audit system; and in response to determining that the first data has been successfully accessed and that the information corresponding to the first access request has been successfully recorded by the external audit system, notify the client device that the first access request has been successfully completed, wherein the notifying the client is contingent upon the determining that the information corresponding to the first access request has been successfully recorded in the blockchain ledger by the external audit system.

10. The device of claim 9, wherein:
a network interface is further configured to receive a second access request from the client device, wherein the second access request specifies second data;
the storage system access point is further configured to:
attempt to execute the second access request;
transmit to the external audit system, via the network interface, a second message indicating that information corresponding to the second access request is to be recorded by the external audit system;
determine that the information corresponding to the first access request has been not been successfully recorded by the external audit system; and
in response to determining that the second data has been successfully accessed, but that that the information corresponding to the second access request has not been recorded by the external audit system, notify the client device that the second access request failed.

11. The device of claim 10, further comprising:
wherein the second access request is a write request, and successfully accessing the second data includes performing a write operation associated with the second data; and
further in response to determining that the information corresponding to the second access request has not been recorded by the external audit system, rolling back the write operation associated with the second data.

12. The device of claim 10, further comprising:
receiving, at the storage system access point, a third access request from the client device, wherein the third access request specifies third data;
attempting to execute the third access request; and
in response to failing to successfully access the third data, notifying the client device that the third access request failed.

13. The device of claim 9, wherein the information corresponding to the first access request includes:
a plurality of information elements atomically defining a compound operation associated with the first access request.

14. The device of claim 9, wherein:
the first access request includes one of a read access request or a write access request; and
the external audit system is part of a blockchain network.

15. The device of claim 9, the storage system access point is further configured to:
in response to determining that the information corresponding to the first access request has been successfully recorded by the external audit system, recording the first access request in a log maintained by the storage system access point.

16. The device of claim 9, wherein the storage system access point is further configured to:
issue a persistent intent by inserting an intent into an intent queue to update the blockchain; and
de-queue the persistent intent in response to logging the first transaction request as being successfully recorded in the blockchain.

17. A data storage system comprising:
a first device including a processor and a network interface, the first device configured to implement a storage system access point, and to operate as a blockchain peer of a blockchain network;
at least one network storage device coupled to the first device, the network storage device including a processor, a network interface, and a memory device;
an external audit system coupled to the first device, the external audit system including at least one processing device configured to operate as a blockchain orderer for the blockchain network;
the storage system access point configured to:
receive a first access request from a client device coupled to the storage system access point via a communications network, wherein the first access request specifies first data;
execute the first access request using the at least one network storage device;
instruct the external audit system to record information corresponding to the first access request in a blockchain; and
notify the client device that the first access request has been successfully completed in response to the information corresponding to the first access request being successfully recorded in the blockchain by the external audit system, wherein the notifying the client is contingent upon determining that the information corresponding to the first access request has been successfully recorded in the blockchain by the external audit system.

18. The data storage system of claim 17, wherein:
the storage system access point is further configured to:
execute a second access request;
instruct the external audit system to record information corresponding to the second access request in the blockchain; and
in response to the information corresponding to the second access request failing to be recorded in the blockchain by the external audit system, notify the client device that the second access request failed.

19. The data storage system of claim 18, further comprising:
wherein the second access request is a write operation; and
rolling back the write operation.

20. The data storage system of claim 17, wherein the information corresponding to the first access request includes:
a plurality of information elements atomically defining a compound operation associated with the first access request.

* * * * *